US008261128B2

(12) United States Patent  (10) Patent No.: US 8,261,128 B2
Lais et al.  (45) Date of Patent: Sep. 4, 2012

(54) SELECTION OF A DOMAIN OF A CONFIGURATION ACCESS

(75) Inventors: Eric N. Lais, Tillson, NY (US); Steve Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 12/849,925

(22) Filed: Aug. 4, 2010

(65) Prior Publication Data

US 2012/0036401 A1  Feb. 9, 2012

(51) Int. Cl.
G06F 11/00 (2006.01)
(52) U.S. Cl. ............... 714/43; 714/4.5; 714/5.1; 714/44; 714/56; 710/306
(58) Field of Classification Search .................... 714/4.5, 714/5.1, 43, 44, 56; 710/268, 306, 311, 313, 710/314
See application file for complete search history.

(56) References Cited

U.S. PATENT DOCUMENTS

| | | | |
|---|---|---|---|
| 5,701,495 A | 12/1997 | Arndt et al. | |
| 5,905,898 A | 5/1999 | Qureshi et al. | |
| 7,398,427 B2 | 7/2008 | Arndt et al. | |
| 7,549,090 B2* | 6/2009 | Bailey et al. | 714/43 |
| 7,613,847 B2 | 11/2009 | Kjos et al. | |
| 2005/0289250 A1 | 12/2005 | Mulla et al. | |
| 2006/0010276 A1 | 1/2006 | Arndt et al. | |
| 2006/0010355 A1* | 1/2006 | Arndt et al. | 714/56 |
| 2006/0195623 A1 | 8/2006 | Arndt et al. | |
| 2006/0253619 A1* | 11/2006 | Torudbakken et al. | 710/31 |
| 2006/0282603 A1 | 12/2006 | Onufryk et al. | |
| 2008/0168186 A1 | 7/2008 | Gregg | |
| 2009/0144731 A1* | 6/2009 | Brown et al. | 718/1 |

OTHER PUBLICATIONS

Aono et al., "The AzusA 16-Way Itanium Server," NEC, pp. 1-7; 0272-1732 2000 IEEE.
Huang et al., "Ally: OS-Transparent Packet Inspection Using Sequestered Cores," pp. 1-8; Second Workshop on I/O Virtualization (WIOV '10), Mar. 13, 2010, Pittsburgh, PA.
Fraser et al., "Safe Hardware Access with the Xen Virtual Machine Monitor," pp. 1-10; Intel Research—University of Cambridge Computer Laboratory, J J Thomson Avenue, Cambridge, UL.
Raj et al., "Scalable I/O Virtualization via Self-Virtualizing Devices," pp. 1-20; CERCS, College of Computing, Georgia Institute of Technology, Atlanta, GA and IBM T.J. Watson Research Lab, Yorktown, NY.
Nilsson et al., "Android Virtualization," pp. 1-39; Columbia University, May 13, 2009.
Krause et al., "I/O Virtualization and Sharing," (slides) pp. 1-56; PCI Express, 2006, PCI-SIG.

* cited by examiner

*Primary Examiner* — Scott Baderman
*Assistant Examiner* — Joseph D Manoskey
(74) *Attorney, Agent, or Firm* — Yudell Isidore Ng Russell, PLLC (57) ABSTRACT

A data processing system includes an input/output (I/O) host bridge to which at least one I/O adapter is coupled by an I/O link. In a register of the I/O host bridge, a configuration partitionable endpoint (PE) field is set to identify a PE to be used for an I/O configuration operation. Thereafter, the host bridge initiates the I/O configuration operation on the I/O link and determines if an error occurred for the I/O configuration operation. In response to a determination that an error occurred for the I/O configuration operation, an error state is set in the I/O host bridge only for the PE indicated in the configuration PE field of the register in the I/O host bridge, wherein I/O configuration errors are isolated to particular PEs.

23 Claims, 5 Drawing Sheets

SELECTION OF A DOMAIN OF A CONFIGURATION ACCESS

CROSS-REFERENCE

The present application is related to the following copending patent applications, which are assigned to the assignee hereof and are filed on even date herewith:
 U.S. patent application Ser. No. 12/849,958;
 U.S. patent application Ser. No. 12/849,980;
 U.S. patent application Ser. No. 12/850,008; and
 U.S. patent application Ser. No. 12/850,040.

BACKGROUND OF THE INVENTION

1. Technical Field

The present invention relates in general to data processing, and in particular, to input/output (I/O) in a data processing system.

2. Description of the Related Art

A data processing system may include multiple processing elements and multiple input/output adapters (IOAs) to support connections to communication networks, storage devices and/or storage networks, and peripheral devices. In such data processing systems, the hardware resources of the data processing system may be logically partitioned into multiple, non-intersecting sets of resources, each controlled by a respective one of multiple possibly heterogeneous operating system instances. The operating systems concurrently execute on this common hardware platform in their respective logical partitions (LPARs) under the control of system firmware, which is referred to as a virtual machine monitor (VMM) or hypervisor. Thus, the hypervisor allocates each LPAR a non-intersecting subset of the resources of the data processing system, and each operating system instance in turn directly controls its distinct set of allocable resources, such as regions of system memory and IOAs.

In any environment including multiple IOAs, it is desirable to isolate IOAs so that each IOA can only obtain access to the resources allocated to it. Isolating IOAs promotes reliability, availability and serviceability of the data processing system, and is especially important in environments supporting hardware virtualization (or logical partitioning), so that IOAs can be individually allocated to different logical partitions (LPARs) and so that any IOA errors be isolated to the particular partition to which the IOA is allocated. For example, for Peripheral Component interconnect (PCI) buses, if an IOA in one LPAR activates the System Error (SERR) signal, the system must make the SERR signal visible to all other LPARs absent some additional control. Making IO errors visible across LPAR boundaries requirement is, of course, contrary to the definition and intent of logical partitioning.

One solution that addresses the partitioning problem with PCI errors is to require assignment of all IOAs connected to one PCI Host Bridge (PHB) to the same LPAR partition. However, this restriction mandates a high resource granularity for IOAs that is not very useful or flexible. Ideally, IOAs should be allocable to different LPARs regardless of the PHB to which the IOA is connected. Alternative solutions include the use of specially designed bridge chips external to the PHBs as described in U.S. Pat. No. 6,643,727 or incorporating additional logic and data structures to enforce partitioning between IOAs in differing LPARs within PHBs as described in U.S. Pat. No. 7,398,427.

SUMMARY OF THE INVENTION

In some embodiments, configuration cycles in a data processing system are isolated to different error domains by functionality in a host bridge that connects input/output adapters (IOAs) to a data processing system.

For example, an exemplary data processing system includes an input/output (I/O) host bridge to which at least one I/O adapter is coupled by an I/O link. In a register of the I/O host bridge, a configuration partitionable endpoint (PE) field is set to identify a PE to be used for an I/O configuration operation. Thereafter, the host bridge initiates the I/O configuration operation on the I/O link and determines if an error occurred for the I/O configuration operation. In response to a determination that an error occurred for the I/O configuration operation, an error state is set in the I/O host bridge only for the PE indicated in the configuration PE field of the register in the I/O host bridge, wherein I/O configuration errors are isolated to particular PEs.

DETAILED DESCRIPTION OF ILLUSTRATIVE EMBODIMENT

Figure 1:
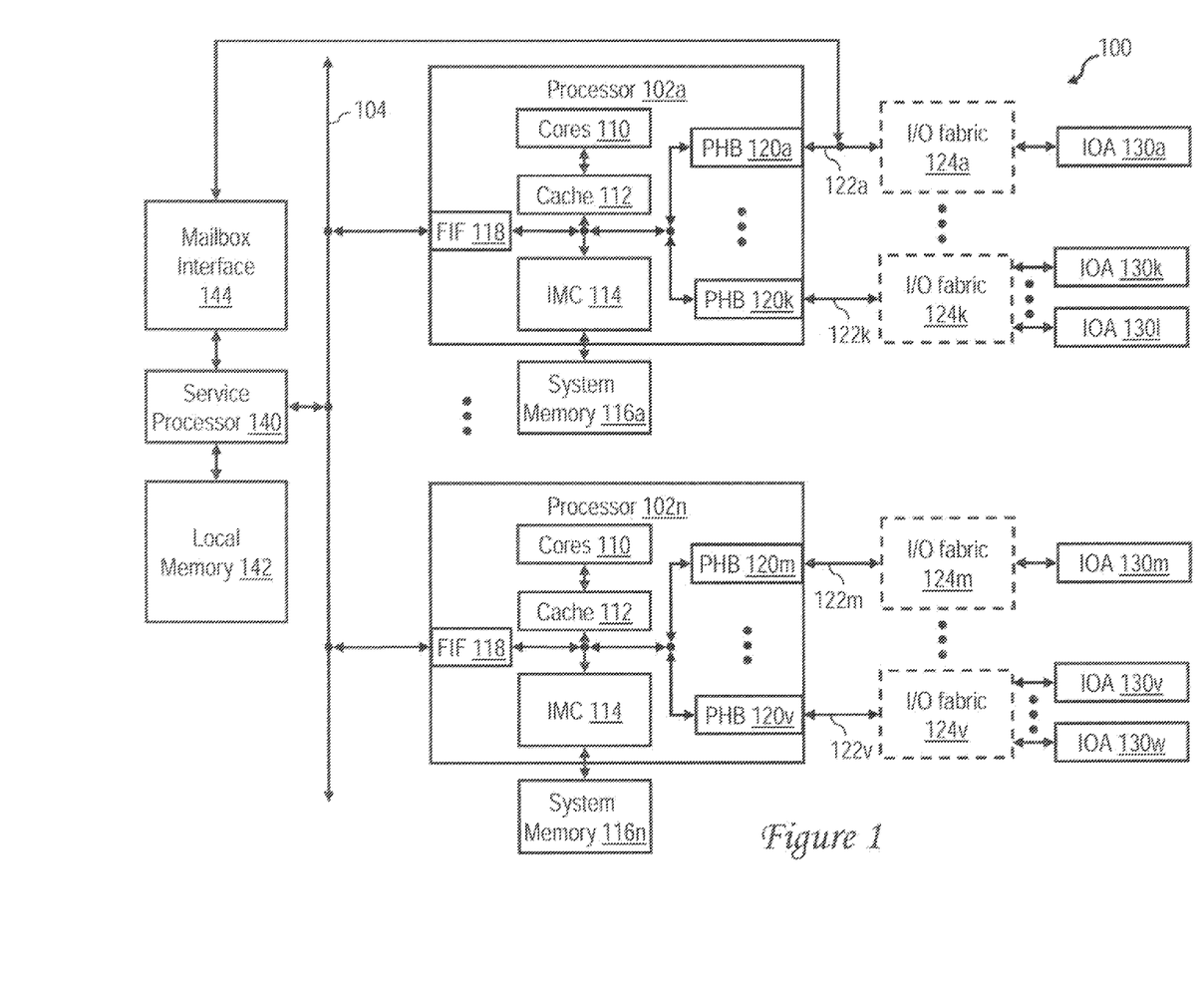
FIG. 1 is a high level block diagram of an exemplary data processing system in accordance with one embodiment.

With reference now to the figures, and in particular with reference to FIG. 1, there is depicted a high level block diagram of an exemplary data processing system 100 in accordance with one embodiment. In some embodiments, data processing system 100 may be, for example, a symmetric multiprocessor (SMP) system including a plurality of processors 102a-102n, each coupled for communication to a system fabric 104, which may include one or more bused or switched communication links. For example, data processing system 100 may be implemented with an IBM eServer, a product line of International Business Machines Corporation of Armonk, N.Y. In alternative embodiments, a data processing system with a single processor 102 may be utilized.

In the depicted embodiment, each processor 102 is preferably realized as a single integrated circuit chip having a substrate in which semiconductor circuitry is fabricated as is known in the art. As shown, processor 102 includes a plurality of processor cores 110 that process data through the execution and/or processing of program code, which may include, for example, software and/or firmware and associated data, if any. Processor 102 further includes cache memory 112 providing one or more levels of relatively low latency temporary storage for instructions and data retrieved from lower levels of the data storage hierarchy. In addition, processor 102 includes an integrated memory controller 114 that controls access to an associated one of off-chip system memories 116.

Each processor 102 further includes a fabric interface (FIF) by which processor 102 communicates with system fabric 104, as well as one or more (and preferably multiple) host bridges supporting input/output communication with various input/output adapters (IOAs) 130. In the depicted embodiment, all of the host bridges are implemented as Peripheral Component Interconnect (PCI) host bridges (PHBs) 120, but in other embodiments the host bridges may implement one or more additional or alternative I/O bus standards.

PHBs 120a, 120k, 120m and 120v provide interfaces to PCI local buses 122a, 122k, 122m and 122v, respectively, to which IOAs 130, such as network adapters, storage device controllers, peripheral adapters, etc., may be directly connected or indirectly coupled. For example, PCI IOA 130a is coupled to PCI local bus 122a optionally through an I/O fabric 124a, which may comprise one or more switches and/or bridges. In a similar manner, PCI IOAs 130k and 130l are coupled to PCI local bus 122k optionally through an I/O fabric 124k, PCI IOA 130m is coupled to PCI local bus 122m optionally through I/O fabric 124m, and PCI IOAs 130v and 130w, which may comprise, for example, a display adapter and hard disk adapter, are coupled to PCI local bus 122v optionally through I/O fabric 124v.

Data processing system 100 further includes a service processor 140 that manages the boot process of data processing system 100 and thereafter monitors and reports on the performance of and error conditions detected in data processing system 100. Service processor 140 is coupled to system fabric 104 and is supported by a local memory 142, which may include volatile (e.g., dynamic random access memory (DRAM)) and non-volatile memory (e.g., non-volatile random access memory (NVRAM) or static random access memory (SRAM)). Service processor 140 is further coupled to a mailbox interface 144 through which service processor 140 communicates I/O operations with PCI bus 122a.

Those of ordinary skill in the art will appreciate that the architecture and components of a data processing system can vary between embodiments. For example, other devices and interconnects may alternatively or additionally be used. Accordingly, the exemplary data processing system 100 given in FIG. 1 is not meant to imply architectural limitations with respect to the claimed invention.

Figure 2:
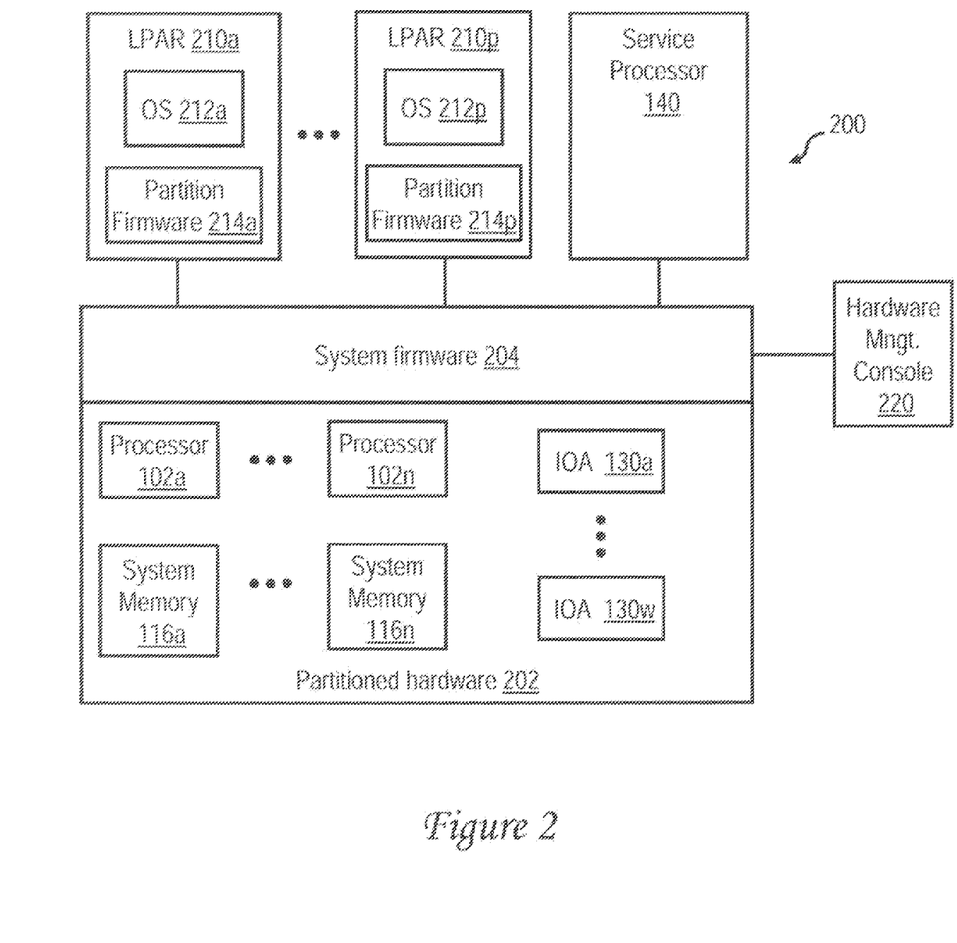
FIG. 2 is a logical view of a data processing system showing the hardware and software resources of the data processing system partitioned into multiple concurrently executing logical partitions (LPARs)

Referring now to FIG. 2, there is depicted a logical view of a data processing system 200 showing the hardware and software resources of the data processing system partitioned into multiple logical partitions (LPARs). Data processing system 200 may have, for example, the same components and/or architecture as data processing system 100 in FIG. 1 and accordingly identifies common components with like reference numerals.

Data processing system 200 has a collection of partitioned hardware 202, including processors 102a-102n, system memories 116a-116n and IOAs 130a-130w. Partitioned hardware 202 may of course include additional unillustrated components, such as additional volatile or nonvolatile storage devices, ports, bridges, switches, etc. The hardware components comprising partitioned hardware 202 (or portions thereof) can be assigned to various ones of logical partitions (LPARs) 210a-210p in data processing system 200 by system firmware 204, also referred to herein as a virtual machine monitor (VMM) or hypervisor. System firmware 204 supports the simultaneous execution of multiple independent operating system instances by virtualizing the partitioned hardware of data processing system 200.

In addition to the hardware resources allocated by system firmware 204, each of LPARs 210a-210p includes a respective one of multiple concurrently executed operating system instances 212a-212p. In various embodiments, operating system instances 212a-212p, which may include, for example, instances of Linux, AIX and/or Windows, may be homogeneous or heterogeneous. Each LPAR 210 may further include unillustrated application programs, as well as a respective instance of partition firmware 214, which may be implemented, for example, with a combination of initial boot strap code, IEEE-1275 Standard Open Firmware, and runtime abstraction software (RTAS). When LPARs 210a-210p are instantiated, a copy of boot strap code is loaded onto partitions 210a-210p by system firmware 204. Thereafter, system firmware 204 transfers control to the boot strap code, which in turn loads the open firmware and RTAS. The processor(s) 102 assigned to each LPAR 210 then execute the partition firmware 214 of that LPAR 210 to bring up the LPAR 210 and initiate execution of the OS instance 212.

In the logically partitioned environment depicted in FIG. 2, service processor 140 can be used to provide various services, such as processing of errors in LPARs 210a-210p. These services may also function as a service agent to report errors back to a system administrator or vendor of data processing system 200. Operation of the different LPARs 210 may further be controlled through a hardware management console 220. In at least one embodiment, hardware management console 220 can be implemented as a separate data processing system from which a system administrator may perform various functions within data processing system 200 including creating and destroying LPARs 210, as well as reallocating hardware and software resources among LPARs 210.

In a logical partitioned environment such as that depicted in FIG. 2, it is not permissible for the hardware or software resources in one LPAR 210 to consume the resources of or affect the operations in another LPAR 210. Furthermore, to be useful, the assignment of resources to LPARs 210 needs to be fine-grained. For example, it is often not acceptable to assign all IOAs 130 under a particular PHB 120 to the same partition, as that will restrict configurability of the system, including the ability to dynamically reallocated resources between partitions. Accordingly, PHBs 120 are able to assign resources, such as individual IOAs 130 (or portions thereof) to different LPARs 210 while preventing the assigned resources from accessing or affecting the resources of other LPARs 210.

To support such isolation between the resources of different LPARs 210, the I/O subsystem of a data processing system is subdivided into multiple partitionable endpoints. A "partitionable endpoint" or "PE" is defined herein as any component or subcomponent of an I/O subsystem that can be allocated to an LPAR independently of any other component or subcomponent of the I/O subsystem. For example, some PEs may comprise a plurality of IOAs and/or I/O fabric components that function together and, thus, should be allocated as a unit to a single LPAR. Another PE, however, may comprise a portion of a single IOA, for example, a separately configurable and separately assignable port of a multi-port IOA. In general, a PE will be identified by its function rather than by its structure.

Figure 3:
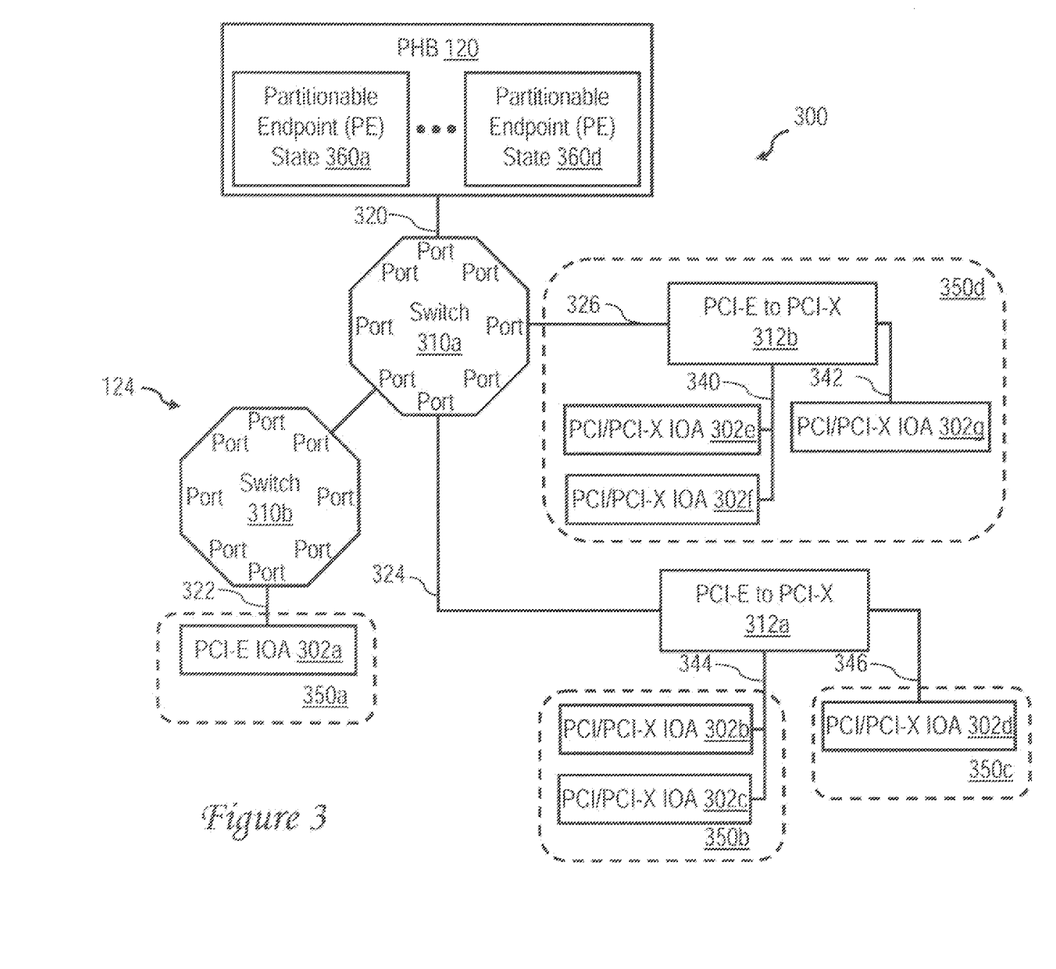
FIG. 3 illustrates an I/O subsystem that provides I/O resource isolation in a data processing system in accordance with one embodiment.

Referring now to FIG. 3, there is depicted a block diagram of at least a portion of the I/O subsystem 300 of a logically partitioned data processing system, such as data processing system 100 of FIG. 1, which exhibits resource isolation between LPARs 210 in accordance with one embodiment.

In the depicted embodiment, I/O subsystem 300 includes a PHB 120 coupled to a plurality of IOAs 302a-302g through an I/O fabric 124. I/O fabric 124 in turn includes switches 310a, 310b, PCI-Express (PCI-E) buses 320, 322, 324 and 326, PCI bridges 312a and 312b, and secondary buses 340, 342, 344 and 346.

As further shown in FIG. 3, system firmware 204 groups various components of I/O subsystem 300 to form a plurality of PEs 350a-350d that are each independently assignable to any of the LPARs 210 of the data processing system. In the given example, PE 350a and PE 350c each comprise a single IOA, namely, IOAs 302a and 302d, respectively. PE 350b, in contrast, comprises two IOAs 302b and 302c that must be assigned to the same LPAR 210. PE 350d comprises three IOAs 302e, 302f and 302g and PCI bridge 312b, which function together as a PE and therefore must be assigned to the same LPAR 210. As noted previously, in other embodiments, a PE may include only a portion (e.g., one or more ports) of an IOA.

In I/O subsystem 300, the respective state of each PE, referred to herein as the partitionable endpoint state, is maintained in the associated PHB 120. Thus, for example, PHB 120 of I/O subsystem 300 includes partitionable endpoint state registers 360a-360d, which correspond to and indicate the states of PEs 350a-350d, respectively.

System firmware 204 assigns each PE one or more domain numbers that associate its component(s) with that PE. In an exemplary embodiment, the domain number assigned each PE comprises a plurality of fields that can further be used to differentiate between I/O components in the PE. For example, these fields may include:

Bus number (Bus) field: provides the highest level of division between I/O resources, with each bus under a PHB having a unique bus number.

Device number (Dev) field: provides an intermediate level of division between I/O resources, with each IOA on a given bus having a different device number.

Function number (Func) field: provides the lowest level of division between I/O resources, with each distinct function of an IOA having a different function number.

As will be appreciated, the domain number (or Bus/Dev/Func number) supports the division of I/O resources down to the lowest level of I/O functionality. For example, the domain number allows separate functions of a multiple function IOA to be differentiated. In data processing systems that do not require such a fine granularity, the domain number can be defined by the Bus field alone, allowing differentiation between the PEs connected to the same PHB, or by the Bus field together with either the Dev field or the Func field to permit differentiation between IOAs of a PE or differentiation between functions of an IOA in a PE that contains a multiple function IOA. The sparseness of the domain number space consisting of the Bus, Bus/Dev, or Bus/Dev/Func fields makes it desirable in many cases to condense the domain number space defined by these fields to something less sparse for internal usage by the PHB 120.

Among the isolation functionalities included in PHB 120 of FIG. 3 is the capability to isolate PE error domains. In logically partitioned data processing systems, different PEs may be assigned to different LPARs. Accordingly, PHBs 120 enable an error occurring in one PE to be isolated to the particular LPAR to which the PE is assigned. More particularly, each PHB 120 includes the capability of stopping I/O operations to and from a PE when an error is detected (referred to as the Stopped state). The stopping of I/O operations is preferably accomplished in such a way that:

1. The PE is prevented from completing an I/O operation in error,
    a. such that the PE does not propagate an error to any LPAR, and
    b. such that a requester of the I/O operation does not use erroneous data.
2. The stopping of operations should appear to a device driver to be isolated to just that device driver.
3. Software (at the device driver level or above) for one PE does not introduce an error that can cause another PE to enter the Stopped state.
4. Fault information for problem determination can be captured after the Stopped state occurs.
5. Firmware can access the configuration space below the PHB when any or all of the PEs are in the Stopped state.

In order to achieve error handling in accordance with these criteria, each PHB preferably provides isolation functionality that identifies a particular error domain for an I/O configuration operation. In a preferred embodiment, the configuration operation error domain capability is enabled by implementing a configuration PE number field in a register of the PHB, which field can be set by the system firmware.

Figure 4:
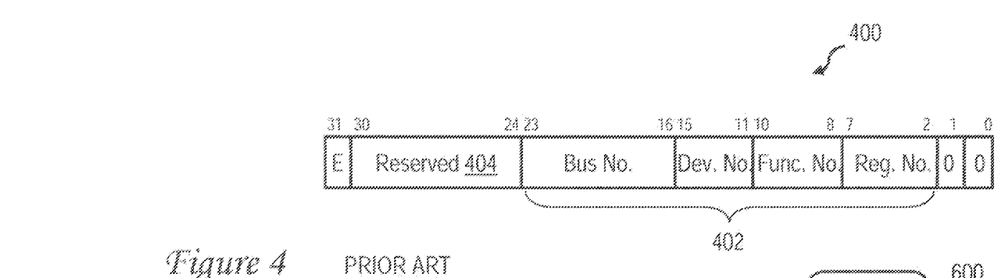
FIG. 4 depicts a conventional PCI CONFIG_ADDRESS register.

Referring now to FIG. 4, there is depicted a conventional CONFIG_ADDRESS register 400 as described in the PCI specifications. The PCI specifications indicate that one facility that can be used to generate configuration operations on a PCI-compliant link is a CONFIG_ADDRESS register 400 in a PHB. In order to perform a conventional PCI configuration access, CONFIG_ADDRESS register 400 is first written with the PCI configuration address 402 comprising a Bus/Dev/Func number of the target PE and a Register number. Thereafter, a Load or Store instruction is issued to read or write configuration data to a separate CONFIG_DATA register (also within the PHB), thus triggering the desired PCI configuration operation.

Figure 5:
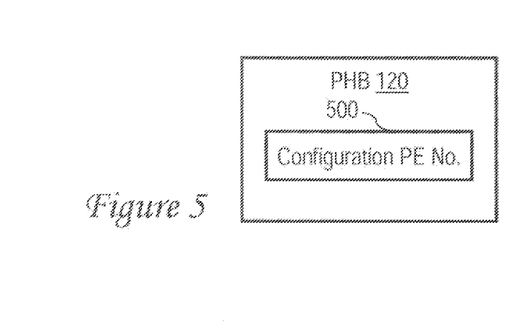
FIG. 5 illustrates an exemplary configuration PE number field in accordance with one embodiment.

With reference now to FIG. 5, there is illustrated an exemplary configuration PE number field 500 in a register of a PHB 120. In various embodiments, configuration PE number field 500 can be implemented in reserved field 404 of CONFIG_ADDRESS Register 400, as an extension to CONFIG_ADDRESS register 400, as a field of another register in PHB 120, or as a standalone register in PHB 120. As discussed further below, configuration PE number field 500 is written in conjunction with CONFIG_ADDRESS register 400 and prior to issuing the Load or Store to the CONFIG_DATA register that will initiate the PCI configuration operation.

Figure 6:
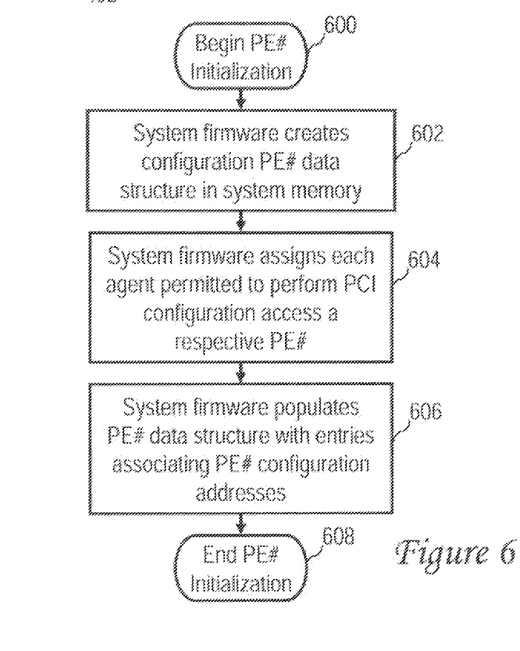
FIG. 6 is a high level logical flowchart of an exemplary process for assigning configuration PE numbers to agents in a logically partitioned data processing system in accordance with one embodiment.

Referring now to FIG. 6, there is depicted a high level logical flowchart of an exemplary process for assigning configuration PE numbers to agents in a logically partitioned data processing system in accordance with one embodiment. As a logical rather than a strictly chronological flowchart, at least some of the illustrated steps may be performed concurrently or in a different order than illustrated.

The depicted initialization process begins at block 600, for example, during the boot process of data processing system 100 and following the instantiation of multiple LPARs 210. The process then proceeds to block 602, which depicts system firmware 204 creating a configuration PE number data structure, such as a configuration PE number table, in one or more of system memories 116. Next, at block 604, system firmware 204 assigns agents capable of participating an I/O configuration access a respective one of a plurality of unique configuration PE numbers. For example, at block 604, system firmware 204 may assign a PE# to each possible requester of an I/O configuration operation, such as system firmware 204 itself and each of the multiple LPARs 210. alternatively or additionally, system firmware 204 may assign a PE# to each IOA 130 to which an I/O configuration operation can be targeted. Thus, each of the PE numbers assigned by system firmware 204 may correspond to a requester PE# or a target.

IOA PE#. At shown at block 606, system firmware 204 then populates the configuration PE number data structure with entries associating each configuration PE number with the configuration addresses 402 corresponding to that configuration PE number. Thereafter, the initialization process shown in FIG. 6 ends at block 608.

Figure 7:
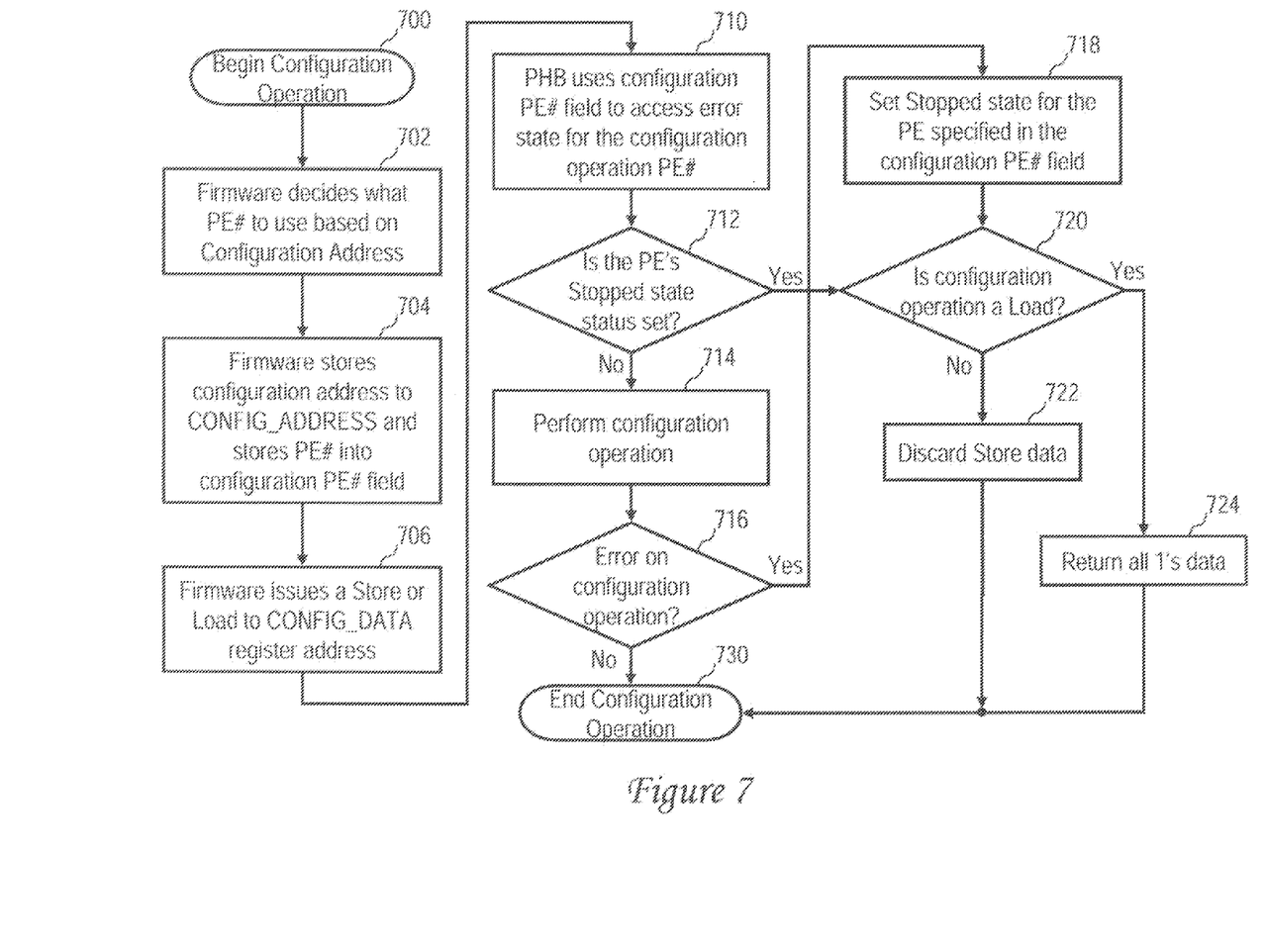
FIG. 7 is a high level logical flowchart of an exemplary process for isolating I/O error domains in an I/O configuration operation in accordance with one embodiment.

With reference now to FIG. 7, there is illustrated a high level logical flowchart of an exemplary process for isolating I/O error domains in a configuration operation in accordance with a preferred embodiment. The illustrated process begins at block 700 in response to detection by system firmware 204 of an I/O configuration operation (e.g., initiated by system firmware 204 itself or one of LPARs 210) and then proceeds to block 702, which depicts system firmware 204 determining what configuration PE number is to be used for the I/O configuration operation. For example, system firmware 204 may determine the configuration PE number by performing a lookup of the configuration address of the I/O configuration operation in the configuration PE number data structure in system memory 116 established by the process of FIG. 6.

At block 704, system firmware 204 stores the configuration address 402 of the I/O configuration operation into CONFIG_ADDRESS register 400 of the relevant PHB 120. In addition, system firmware 204 stores the configuration PE number determined at block 702 into configuration PE number field 500 within the PHB 120. System firmware 204 then issues a Store or Load operation to the CONFIG_DATA address, causing the PHB 120 to initiate the I/O configuration operation processing (block 706). In a preferred embodiment, system firmware 204 can store the configuration PE number into configuration PE number field 500 as shown at block 704 prior to, coincidentally with, or after storing the configuration address into CONFIG_ADDRESS register 400, but preferably does so prior to the access to the CONFIG_DATA address as depicted at block 706.

The process proceeds from block 706 to block 710, which depicts PHB 120 accessing the PE state for the I/O configuration operation in the PE state register 360 identified by the configuration PE number contained in configuration PE number field 500. At block 712, PHB 120 then determines whether the PE state accessed at block 710 indicates the Stopped state is currently set for the PE. If so, then error processing continues at block 720, which is described below. If, however, PHB 120 determines at block 712 that the Stopped state it is not currently set for the PE, PHB 120 performs the indicated I/O configuration operation, for example, by issuing the I/O configuration operation on the appropriate PCI bus or link coupled to PHB 120 (block 714).

PHB 120 next determines at block 716 whether or not performing the I/O configuration operation resulted in an error, fore example, by examining the operation status that returned on the PCI bus or link in response to the I/O configuration operation. If PHB 120 determines at block 716 that no error occurred during completion of the I/O configuration operation, the I/O configuration operation ends at block 730. If, however, PHB 120 determines at block 716 that an error occurred in performing the I/O configuration operation, PHB 120 sets the Stopped state in the PE state register 360 corresponding to the configuration PE number indicated in configuration PE number field 500 (block 718). The process then proceeds to block 720.

Block 720 depicts a determination whether the I/O configuration operation is a configuration Load or Store operation. If the I/O configuration operation is a Store, then PHB 120 discards the Store data as shown at block 722. If, however, the I/O configuration operation is a Load, then PHB 120 completes the I/O configuration operation by returning data indicative of an error state, for example, all 1's (block 724). Following either block 722 or block 724, the process shown in FIG. 7 ends at block 730.

As has been described, a method, apparatus and system provide isolation between error domains for I/O configuration operations in a data processing system. Thus, in contrast to conventional systems in which error domains span the entire range of I/O addresses, error states are limited herein to the same PE targeted by the I/O configuration access, facilitating robust error processing.

The foregoing description has been presented for purposes of illustration and elaboration, and is not intended to be exhaustive or limited to the structures and processes disclosed. Many modifications and variations will be apparent to those of ordinary skill in the art. Various embodiments were chosen and described in order to best explain the principles of operation, the practical application, and to enable others of ordinary skill in the art to understand and apply the disclosed teachings in various embodiments with any modifications suitable for the particular use contemplated.

While the present invention has been particularly shown as described with reference to one or more preferred embodiments, it will be understood by those skilled in the art that various changes in form and detail may be made therein without departing from the spirit and scope of the invention. For example, while the present invention has been described in the context of a fully functioning data processing system, those of ordinary skill in the art will appreciate that the processes of the present invention are capable of being distributed in the form of a computer program product including a computer readable storage medium having program code stored therein. Examples of computer readable storage media include hard disk drives, RAM or other volatile memory, non-volatile memory, and optical storage media.

What is claimed is:

1. A method of data processing in a data processing system including an input/output (I/O) host bridge to which at least one I/O adapter is coupled by an I/O link, the method comprising:
   in a register of the I/O host bridge, setting a configuration partitionable endpoint (PE) field to identify a PE to be used for an I/O configuration operation;
   thereafter, the I/O host bridge initiating the I/O configuration operation on the I/O link;
   determining if an error occurred for the I/O configuration operation; and
   in response to a determination that an error occurred for the I/O configuration operation, setting an error state in the I/O host bridge only for the PE indicated by the configuration PE field of the register in the I/O host bridge, wherein I/O configuration errors are isolated to particular PEs.

2. The method of claim 1, wherein:
   the data processing system is a logically partitioned data processing system;
   the I/O host bridge supports multiple partitionable endpoints (PEs) and implements a respective one of a plurality of state registers for each of the multiple PEs; and
   setting an error state includes setting one of the plurality of state registers corresponding to the PE indicated in the configuration PE field.

3. The method of claim 1, wherein:
   the method further comprises prior to the initiating, the I/O host bridge checking if an error state is already set for the partitionable endpoint (PE) indicated in the configuration PE field; and the I/O host bridge initiates the I/O configuration operation on the I/O link only if the error state is not already set for the PE indicated in the configuration PE field.

4. The method of claim 1, wherein:
the method further comprises determining the PE targeted by the I/O configuration operation from a data structure including entries associating each of a plurality of PEs in the data processing system with one or more configuration addresses; and
setting the configuration PE field is performed in response to determining the PE.

5. The method of claim 4, and further comprising:
system firmware populating the data structure with the entries based upon an allocation of I/O resources among a plurality of logical partitions.

6. The method of claim 1, wherein:
the I/O host bridge is a Peripheral Component Interconnect (PCI) host bridge; and
the host bridge initiating the I/O configuration operation on the I/O link comprises the PCI host bridge initiating a PCI configuration operation on the I/O link.

7. The method of claim 1, wherein the setting comprises setting the configurable PE field to identify a PE of a requestor of the I/O configuration operation.

8. The method of claim 1, wherein the setting comprises setting the configurable PE field to identify a PE of a target of the I/O configuration operation.

9. A data processing system, comprising:
a processor core;
data storage coupled to the processor core;
an I/O adapter; and
an input/output (I/O) host bridge coupled to the processor core and coupled to the I/O adapter by an I/O link, wherein the I/O host bridge includes a register including a configuration partitionable endpoint (PE) field, and wherein the I/O host bridge, responsive to setting of the configuration PE field to identify a PE to be used for an I/O configuration operation, initiates the I/O configuration operation on the I/O link and, responsive to a determination that an error occurred for the I/O configuration operation, sets an error state in the I/O host bridge only for the PE indicated by the configuration PE field, wherein I/O configuration errors are isolated to particular PEs.

10. The data processing system of claim 9, wherein:
the data processing system is a logically partitioned data processing system including multiple logical partitions;
the I/O host bridge supports multiple partitionable endpoints (PEs) and includes a respective one of a plurality of state registers for each of the multiple PEs; and
the I/O host bridge sets an error state for the PE indicated in the configuration PE field by setting an associated one of the plurality of state registers.

11. The data processing system of claim 9, wherein the I/O host bridge, prior to initiating the I/O configuration operation, checks if an error state is already set for the partitionable endpoint (PE) indicated in the configuration PE field and initiates the I/O configuration operation on the I/O link only if the error state is not already set for the PE indicated in the configuration PE field.

12. The data processing system of claim 9, wherein the data storage includes:
a data structure including entries associating each of a plurality of PEs in the data processing system with one or more configuration addresses; and
system firmware in the data storage that determines the PE targeted by the I/O configuration operation by reference to the data structure and sets the configuration PE field in the register of the I/O host bridge.

13. The data processing system of claim 12, wherein the system firmware populates the data structure with the entries based upon an allocation of I/O resources among a plurality of logical partitions in the data processing system.

14. The data processing system of claim 9, wherein:
the I/O host bridge is a Peripheral Component Interconnect (PCI) host bridge; and
I/O configuration operation comprises PCI configuration operation.

15. The data processing system of claim 9, wherein the configurable PE field identifies a PE of a requestor of the I/O configuration operation.

16. The data processing system of claim 9, wherein the configurable PE field identifies a PE of a target of the I/O configuration operation.

17. A processor for a data processing system, the processor comprising:
a processor core; and
an input/output (I/O) host bridge, coupled to the processor core, to which one or more I/O adapters can be coupled by an I/O link, wherein the I/O host bridge includes a register including a configuration partitionable endpoint (PE) field, and wherein the I/O host bridge, responsive to setting of the configuration PE field to identify a PE targeted to be used for I/O configuration operation, initiates the I/O configuration operation on the I/O link and, responsive to a determination that an error occurred for the I/O configuration operation, sets an error state in the I/O host bridge only for the PE indicated by the configuration PE field, wherein I/O configuration errors are isolated to particular PEs.

18. The processor of claim 17, wherein:
the data processing system is a logically partitioned data processing system including multiple logical partitions;
the I/O host bridge supports multiple partitionable endpoints (PEs) and includes a respective one of a plurality of state registers for each of the multiple PEs; and
the I/O host bridge sets an error state for the PE indicated in the configuration PE field by setting an associated one of the plurality of state registers.

19. The processor of claim 17, wherein the I/O host bridge, prior to initiating the I/O configuration operation, checks if an error state is already set for the partitionable endpoint (PE) indicated in the configuration PE field and initiates the I/O configuration operation on the I/O link only if the error state is not already set for the PE indicated in the configuration PE field.

20. The processor of claim 17, wherein:
the I/O host bridge is a Peripheral Component Interconnect (PCI) host bridge; and
I/O configuration operation comprises PCI configuration operation.

21. The processor of claim 17, wherein the configurable PE field identifies a PE of a requestor of the I/O configuration operation.

22. The processor of claim 17, wherein the configurable PE field identifies a PE of a target of the I/O configuration operation.

23. The processor of claim 17, wherein the processor comprises a single integrated circuit chip including the processor core and the I/O host bridge.

\* \* \* \* \*